(12) United States Patent
Kakumoto

(10) Patent No.: US 7,190,399 B2
(45) Date of Patent: Mar. 13, 2007

(54) IMAGE PICKUP APPARATUS

(75) Inventor: Tomokazu Kakumoto, Nagaokakyo (JP)

(73) Assignee: Minolta Co., Ltd., Osaka (JP)

( * ) Notice: Subject to any disclaimer, the term of this patent is extended or adjusted under 35 U.S.C. 154(b) by 925 days.

(21) Appl. No.: 10/406,110

(22) Filed: Apr. 3, 2003

(65) Prior Publication Data
US 2004/0125221 A1    Jul. 1, 2004

(30) Foreign Application Priority Data
Dec. 25, 2002 (JP) .............................. 2002-375029

(51) Int. Cl.
*H04N 5/335* (2006.01)
(52) U.S. Cl. ..................... 348/308; 348/297; 348/302
(58) Field of Classification Search ................ 348/302, 348/304, 308
See application file for complete search history.

(56) References Cited

U.S. PATENT DOCUMENTS

| 4,973,833 | A | * | 11/1990 | Takada et al. | ........... 250/208.1 |
| 5,241,575 | A | * | 8/1993 | Miyatake et al. | ............. 377/60 |
| 5,289,286 | A | * | 2/1994 | Nakamura et al. | ....... 348/223.1 |
| 5,526,058 | A | * | 6/1996 | Sano et al. | ................. 348/647 |
| 6,660,989 | B2 | * | 12/2003 | Guo et al. | ............... 250/208.1 |
| 6,836,291 | B1 | * | 12/2004 | Nakamura et al. | .......... 348/301 |
| 6,867,409 | B2 | * | 3/2005 | Kusuda et al. | ........... 250/208.1 |
| 6,891,144 | B2 | * | 5/2005 | Tecchiolli et al. | ....... 250/208.1 |
| 6,909,462 | B1 | * | 6/2005 | Shinotsuka et al. | .......... 348/308 |
| 7,009,649 | B2 | * | 3/2006 | Watanabe | .................... 348/308 |
| 7,068,312 | B2 | * | 6/2006 | Kakumoto et al. | .......... 348/241 |
| 2001/0013571 | A1 | | 8/2001 | Kakumoto et al. | ....... 250/208.1 |

FOREIGN PATENT DOCUMENTS

| JP | 07-336694 A | 12/1995 |
| JP | 08-237638 A | 9/1996 |
| JP | 2001-094878 A | 4/2001 |

OTHER PUBLICATIONS

U.S. Appl. No. 09/619,435, filed Jul. 19, 2000, Hagihara et al.

* cited by examiner

*Primary Examiner*—Ngoc-Yen Vu
*Assistant Examiner*—Nicholas G Giles
(74) *Attorney, Agent, or Firm*—Sidley Austin LLP

(57) ABSTRACT

An image pickup apparatus comprising: a plurality of pixels each with a photodiode, a logarithmic converter including a logarithmic-converting MOS transistor for converting an output of the photodiode into an electric signal proportional to a logarithmic value of an amount of incident light on the photodiode, and an integration circuit for accumulating an output from the logarithmic converter; a voltage controller for control of a voltage to be applied to the transistor; and an output circuit for receiving signals from the pixels and outputting processed signals. The voltage controller realizes a moving object extraction image pickup state in which an image pickup signal is generated for displaying at least a part of the moving object existing in an image picked-up region at a density different from that of a static background part.

19 Claims, 7 Drawing Sheets

P          Q

IMAGE PICKUP APPARATUS

CROSS-REFERENCE TO RELATED APPLICATION

This application is based on Japanese patent application No.2002-375029 filed in Japan on Dec. 25, 2002, the entire content of which is hereby incorporated by reference.

BACKGROUND OF THE INVENTION

1. Field of the Invention

The present invention relates to an image pickup apparatus capable of detecting a moving object.

2. Description of Related Art

A wide variety of image pickup apparatuses have been proposed.

The proposed image pickup apparatuses having a wide dynamic range include those having pixels for pickup operation, each pixel including a photoelectric conversion element and a logarithmic converter which gives an output by natural-logarithmical photoelectric conversion of an amount of light incident on the photoelectric conversion element.

U.S. Pat. No. 5,241,575 discloses such image pickup apparatus. The disclosed image pickup apparatus is provided with, for example, photodiodes as the photoelectric conversion elements and MOS transistors for logarithmic conversion as the logarithmic converters. The U.S. Pat. No. 5,241,575 also discloses pixels incorporating an integration circuit for accumulating the output of the logarithmic converter.

Proposed logarithmic conversion-type image pickup apparatuses include those capable of cancelling irregularities of sensitivity among pixels. This type of image pickup apparatus is disclosed in Japanese unexamined laid-open patent publication No.2001-94878. The disclosed apparatus is capable of cancelling irregularities of sensitivity among pixels without employing a technique of detecting the irregularities of sensitivity among pixels by irradiating the pixels with uniform light.

In the image pickup technology field, research has been conducted on the detection of a moving object in order to monitor, for example, intruders and the like. A background finite difference method (method of detecting a moving object by use of difference between a background image and an inputted image) was proposed for this purpose. Japanese unexamined laid-open patent publication No.7-336694 (336694/1995) discloses a method of detecting a moving object according to such background finite difference method.

However, for detection of a moving object, conventional image pickup apparatuses involve a complicated processing of signals from an image pickup sensor. Now it is desired to develop an image pickup apparatus capable of easily detecting a moving object without executing such complicated processing of signals. Such image pickup apparatus is easily applicable for technologies in the monitoring field.

SUMMARY OF THE INVENTION

An object of the present invention is to provide a moving object extraction type image pickup apparatus capable of easily detecting the existence of a moving object without a need to execute a complicated signal processing.

Another object of the present invention is to provide an image pickup apparatus capable of being set to either a state of detecting the existence of a moving object or a state of executing a normal image pickup.

A further object of the present invention is to provide an image pickup apparatus capable of detecting the existence of a moving object and allowing an operator to visually recognize more precisely what the moving object is.

The present inventor conducted extensive research to achieve the foregoing objects and found the following.

If at least a part of a moving object existing in a region wherein a subject image is to be picked up (hereinafter referred to as "image picked-up region") can be displayed at a density different from that of a static background part existing in the image picked-up region, the existence of the moving object can be detected without executing a complicated signal processing or image processing because the displayed part is different in density from the static background part.

The moving object, when viewed from the image pickup apparatus, generates a part variable in luminance in the image picked-up region. Consequently, for example, when a part invariable in luminance in the image picked-up region is displayed at the same density or in other words, is exhibited as a background part at the same density, and when the part variable in luminance in the image picked-up region is displayed at a higher or lower density than the background part having the same density, the moving object can be detected because of existence of the part having a higher density or a lower density than the background part.

Such image display can be performed, for example, by use of an image pickup apparatus having image pickup pixels each with a photoelectric conversion element, and a logarithmic converter including a logarithmic-converting transistor for converting an output of the photoelectric conversion element into an electric signal proportional to a logarithmic value of an amount of light incident on the photoelectric conversion element, or by use of an image pickup apparatus including the pixels each additionally having an integration circuit for accumulating an output of the logarithmic converter.

More specifically, an image pickup operation is carried out by applying a first voltage for normal image pickup to the logarithmic-converting transistor, and then applying a second voltage to the transistor for resetting purpose, wherein the second voltage is controlled.

For example, the controlled second voltage to be applied is such that an absolute value of difference between the first voltage and the controlled second voltage is set at a value lower than an absolute value of difference between a first voltage and a second voltage to be applied for normal image pickup state. Alternatively, the controlled second voltage to be applied is such that a time duration of the second voltage is set shorter than a time duration of the second voltage to be applied for the normal image pickup state. In so doing, a reset residue occurs in the logarithmic-converting transistor.

Due to the characteristic of the logarithmic-converting transistor, the reset residue is increased in the pixels wherein the amount of incident light is larger, whereas the reset residue is decreased in the pixels wherein the amount of incident light is smaller.

Accordingly, utilizing difference between an image signal outputted from each pixel by applying a first voltage in image pickup operation and a noise signal outputted from each pixel in resetting operation (with a reset residue), the image signal can be subjected to finite difference processing.

By the finite difference processing, the image signals show substantially the same value in respect of pixels performing image pickup operation for a part of the image picked-up region with invariable luminance (static background part).

According to this method, image display can be performed at substantially the same density (e.g., gray) in respect of the part of the image picked-up region with invariable luminance (static background part).

On the other hand, a moving object generates a part in the image picked-up region which is variable in luminance, e.g., from "dark" degree to "bright" degree; from "dark" degree to "bright" degree and therefrom to "dark" degree; from "bright" degree to "dark" degree; from "bright" degree to "dark" degree and therefrom to "bright" degree, etc.

In view of such transition in luminance, the image picked-up region shows a part to be displayed more darkly or brightly than the static background part to be displayed in substantially the same density. Utilizing such phenomenon, the part of the image picked-up region variable in luminance is extracted, whereby the existence of a moving object is detected.

Based on the foregoing findings, the following image pickup apparatuses are provided according to the invention.

(1) First Image Pickup Apparatus

The first image pickup apparatus is a solid-state image pickup apparatus comprising:

a plurality of pixels each with a photoelectric conversion element, a logarithmic converter including a logarithmic-converting transistor for converting an output of the photoelectric conversion element into an electric signal proportional to a logarithmic value of an amount of light incident on the photoelectric conversion element, and an integration circuit for accumulating an output from the logarithmic converter;

a voltage controller for controlling a voltage to be applied to the logarithmic-converting transistor; and an output circuit for receiving signals from the pixels and outputting signals;

wherein the voltage controller is configured such that in a state wherein a first voltage for image pickup is applied to the logarithmic-converting transistor at a time of image pickup, a first signal outputted via the logarithmic converter from the photoelectric conversion element is accumulated at the integration circuit, a second voltage is applied to the logarithmic-converting transistor at a time of resetting the logarithmic-converting transistor to reset the transistor, a second signal obtained from the logarithmic converter by the reset is accumulated at the integration circuit, and the second voltage is set at a value at which an absolute value of difference between the first voltage and the second voltage is lower than a value at which a normal image pickup state is achievable, thereby realizing a moving object extraction image pickup state in which an image pickup signal is generated for displaying at least a part of a moving object existing in an image picked-up region at a density different from that of a static background part existing in the image picked-up region; and wherein the output circuit outputs the signals each corresponding to difference between the first signal and the second signal.

(2) Second Image Pickup Apparatus

The second image pickup apparatus is a solid-state image pickup apparatus comprising:

a plurality of pixels each with a photoelectric conversion element, a logarithmic converter including a logarithmic-converting transistor for converting an output of the photoelectric conversion element into an electric signal proportional to a logarithmic value of an amount of light incident on the photoelectric conversion element, and an integration circuit for accumulating an output from the logarithmic converter;

a voltage controller for controlling a voltage to be applied to the logarithmic-converting transistor; and an output circuit for receiving signals from the pixels and outputting signals;

wherein the voltage controller is configured such that in a state wherein a first voltage for image pickup is applied to the logarithmic-converting transistor at a time of image pickup, a first signal outputted via the logarithmic converter from the photoelectric conversion element is accumulated at the integration circuit, a second voltage is applied to the logarithmic-converting transistor at a time of resetting the logarithmic-converting transistor to reset the transistor, and a second signal obtained from the logarithmic converter by the reset is accumulated at the integration circuit, and the second voltage is so controlled as to execute change-over between a normal image pickup state and a moving object extraction image pickup state in which an image pickup signal is generated for displaying at least a part of a moving object existing in an image picked-up region at a density different from that of a static background part existing in the image picked-up region; and wherein the output circuit outputs the signals each corresponding to difference between the first signal and the second signal.

(3) Third Image Pickup Apparatus

The third image pickup apparatus is an image pickup apparatus comprising:

an image pickup sensor capable of conducting a change-over, by change of driving conditions of the image pickup sensor, between a normal image pickup state and a moving object extraction image pickup state in which an image pickup signal is generated for displaying at least a part of a moving object existing in an image picked-up region at a density different from that of a static background part existing in the image picked-up region;

a moving object detector for determining whether the moving object is included in image pickup data in the moving object extraction image pickup state; and a switch circuit for switching the state of the image pickup sensor from the moving object extraction image pickup state to the normal image pickup state by change of the driving conditions of the image pickup sensor on detection of the moving object by the moving object detector.

The foregoing and other objects, features, aspects and advantages of the present invention will become more apparent from the following detailed description and the accompanying drawings.

DESCRIPTION OF THE PREFERRED EMBODIMENTS

Figure 1:
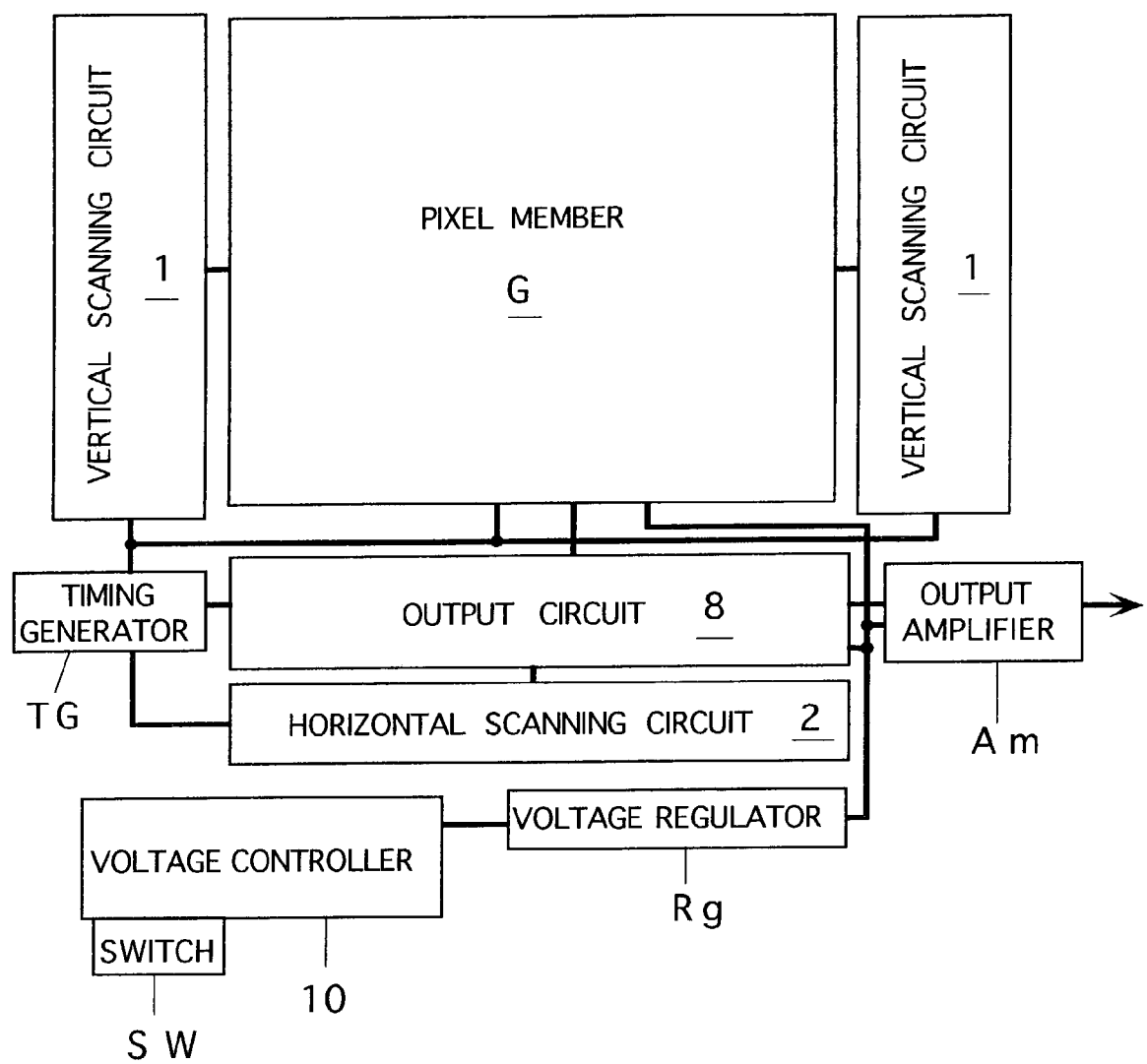
FIG. 1 is a block diagram showing an example of the solid-state image pickup apparatus.

The following description is given about three types of image pickup apparatuses according to embodiments of the invention.

(1) Solid-state Image Pickup Apparatus for Exclusive use in Detecting the Existence of a Moving Object This type of image pickup apparatus is provided with an image pickup sensor, a voltage controller for controlling voltages to be applied to the image pickup sensor, and an output circuit.

The image pickup sensor has a plurality of pixels for image pickup, and each pixel includes a photoelectric conversion element, a logarithmic converter including a logarithmic-converting transistor for converting an output of the photoelectric conversion element into an electric signal proportional to a logarithmic value of an amount of light incident on the photoelectric conversion element; and an integration circuit for accumulating an output of the logarithmic converter.

The voltage controller is adapted to control a voltage to be applied to the logarithmic-converting transistor. More specifically, in a state wherein a first voltage for image pickup is applied to the logarithmic-converting transistor at a time of image pickup, a first signal outputted via the logarithmic converter from the photoelectric conversion element is accumulated at the integration circuit, a second voltage is applied to the logarithmic-converting transistor at a time of resetting the logarithmic-converting transistor to reset the transistor, and a second signal obtained from the logarithmic converter by the reset is accumulated at the integration circuit.

The voltage controller is also configured such that the second voltage is set at a value at which an absolute value of difference between the first voltage and the second voltage is lower than a value at which a normal image pickup state is achievable, thereby realizing a moving object extraction image pickup state in which an image pickup signal is generated for displaying at least a part of a moving object existing in an image picked-up region at a density different from that of a static background part existing in an image picked-up region.

The aforementioned value at which a normal image pickup state is achievable is an absolute value of difference between a first voltage and a second voltage to be applied to the logarithmic-converting transistor for normal image pickup operation.

The output circuit receives signals from the pixels and outputs signals. More specifically, the output circuit outputs the signals each corresponding to difference between the first signal and the second signal.

According to the above-mentioned image pickup apparatus, the moving object extraction image pickup state is realized, whereby image pickup data can be generated which can display at least a part of the moving object bringing about variation of luminance more darkly or brightly than a background image showing a static background part displayed at substantially same density. Thereby the existence of the moving object can be detected without a need for a complicated signal processing or image processing.

To assure extraction of the moving object which brings about variation of luminance, the voltage controller may set each of the first and second voltages at a level which generates an image pickup signal for displaying the static background part in its entirety at a uniform intermediate density in the moving object extraction image pickup state.

The voltage controller may be allowed to realize the moving object extraction image pickup state by setting the second voltage at a value different from a level at which the normal image pickup state is achievable.

In order to find the travelling speed and/or the travelling direction of the moving object, data indicating a travelling locus of the moving object existing in the image picked-up region may be included in one-frame data obtainable in the moving object extraction image pickup state. The travelling speed and/or the travelling direction of the moving object can be discovered using such data for the following reason.

The width and the direction of a bright or dark display part showing the existence of a moving object obtained due to the moving object extraction image pickup state are variable depending on the travelling speed and the direction of the moving object. The width of the dark or bright display part showing the moving object is increased as the travelling speed of the moving object is increased.

Usually the information on the travelling speed and the travelling direction of the moving object can not be read out from a static image. However, in the static image obtained by this image pickup apparatus, the travelling speed and/or the travelling direction of the moving object can be discovered by measuring the width of the dark or bright display part showing the moving object, and/or by determining the direction thereof. The travelling speed and/or the direction of the moving object can be easily automatically determined using a calculator based on the data showing the travelling locus. The travelling speed and/or the direction of the moving object can be also easily determined with human eyes, e.g., by use of a table showing a relation between the width and the speed and the like.

The image pickup apparatus may be further provided with a switch for electrically detachably contacting the photoelectric conversion elelment with the logarithmic-converting transistor. In this case, the voltage controller may be of the type in which with the switch off, the logarithmic-converting transistor is reset by applying the second voltage to the transistor.

(2) Solid-state Image Pickup Apparatus Which can be set to Any of a State of Detecting a Moving Object (Moving Object Extraction Image Pickup State) and a State of Executing Normal Image Pickup (Normal Image Pickup State)

The image pickup apparatus includes an image pickup sensor, a voltage controller for controlling voltages to be applied to the image pickup sensor and an output circuit.

The image pickup sensor has a plurality of image pickup pixels, each with a photoelectric conversion element, a logarithmic converter including a logarithmic-converting transistor for converting an output of the photoelectric conversion element into an electric signal proportional to a logarithmic value of an amount of light incident on the photoelectric conversion element, and an integration circuit for accumulating an output of the logarithmic converter.

The voltage controller controls the voltage to be applied to the logarithmic-converting transistor. More specifically, in a state wherein a first voltage for image pickup is applied to the logarithmic-converting transistor at a time of image pickup, a first signal outputted via the logarithmic converter from the photoelectric conversion element is accumulated at the integration circuit, a second voltage is applied to the logarithmic-converting transistor at a time of resetting the logarithmic-converting transistor to reset the transistor, and a second signal obtained from the logarithmic converter by the reset is accumulated at the integration circuit.

The voltage controller is also configured such that the second voltage is so controlled as to execute change-over between a normal image pickup state and a moving object extraction image pickup state in which an image pickup signal is generated for displaying at least a part of a moving object existing in an image picked-up region at a density different from that of a static background part existing in the image picked-up region.

The output circuit receives signals from the pixels and outputs signals. More specifically the output circuit outputs the signals each corresponding to difference between the first signal and second signal.

According to the above-described image pickup apparatus, a change-over can be executed between the moving object extraction image pickup state and the normal image pickup state.

In the moving object extraction image pickup state, at least a part of a moving object bringing about variation in luminance can be displayed more darkly or brightly than a background image of the same density showing a static background part. Thereby the existence of the moving object can be detected without a need for a complicated signal processing or image processing.

In the normal image pickup state, an image pickup operation can be executed such that image display can be performed according to the luminances in parts of the image picked-up region.

The voltage controller may be configured such that for example, change-over to the moving object extraction image pickup state can be executed by controlling the second voltage such that an absolute value of difference between the first voltage and the second voltage is lower than a value at which a normal image pickup state is achievable.

In this case, the voltage controller may be adapted to control the second voltage, for example, such that the absolute value of difference between the first voltage and the second voltage is approximately half of the value at which the normal image pickup state is achievable, whereby change-over to the moving object extraction image pickup state can be effected.

The aforementioned value at which a normal image pickup state is achievable is an absolute value of difference between a first voltage and a second voltage to be applied to the logarithmic-converting transistor for normal image pickup operation.

The voltage controller may be of the type which, e.g., can execute change-over to the normal image pickup state by controlling the second voltage to set a value at which the absolute value of difference between the first voltage and the second voltage is higher than the value at which the moving object extraction state is achievable.

The image pickup apparatus may be further provided with a switch for electrically detachably contacting the photoelectric conversion element with the logarithmic-converting transistor. In this case, the voltage controller may be of the type in which with the switch off, the logarithmic-converting transistor is reset by applying the second voltage to the transistor.

Typical examples of the logarithmic-converting transistor in the logarithmic converter include a MOS transistor. When the MOS transistor is used, the voltage controller is configured such that in a state wherein the first voltage is applied to a source electrode of the MOS transistor for logarithmic conversion at the time of image pickup, a signal outputted via the logarithmic converter from the photoelectric conversion element is accumulated as the first signal at the integration circuit, and such that at the time of the reset, a signal obtained by applying the second voltage to the source electrode of the MOS transistor for logarithmic conversion to reset the transistor is accumulated as the second signal at the integration circuit.

(3) Image Pickup Apparatus Capable of Detecting a Moving Object and Allowing an Operator to more Precisely Visually Recognize what the Moving Object is.

The image pickup apparatus is provided with an image pickup sensor capable of switching an image pickup state between a normal image pickup state and a moving object extraction image pickup state by change of driving conditions of the image pickup sensor. In the latter state, an image pickup signal is generated for displaying at least a part of a moving object existing in an image picked-up region at a density different from that of a static background part existing in the image picked-up region.

The image pickup apparatus also provided with a moving object detector for determining whether a moving object is included in image pickup data in the moving object extraction image pickup state; and a switch circuit for switching the state of the image pickup sensor from the moving object extraction image pickup state to the normal image pickup state by changing the driving conditions of the image pickup sensor when the moving object detector detects the moving object.

Typical examples of the image pickup sensor include those having a plurality of pixels each with a photoelectric conversion element and a logarithmic converter including a logarithmic-converting transistor for converting an output of the photoelectric conversion element into an electric signal proportional to a logarithmic value of an amount of light incident on the photoelectric conversion element. When such image pickup sensor is used, a switch circuit is useful which is capable of switching the image pickup state by controlling a voltage to be applied to the logarithmic-converting transistor. The pixels of the image pickup sensor may further include an integration circuit for accumulating an output of the logarithmic converter.

The image pickup apparatus may be further provided with a signal generator for feeding to the switch circuit a switch signal for switching the state of the image pickup sensor from the normal image pickup state to the moving object extraction image pickup state.

The signal generator may include a timer and may be of the type which feeds the switch signal to the switch circuit on count of a second(s) for a specified time by the timer.

The moving object detector may have a comparator for comparing a threshold value useful as a reference in determining the presence or absence of the moving object with an output from the image pickup sensor.

The above-mentioned three types of image pickup apparatuses are applicable to, e.g., a monitoring apparatus such as camera.

Figure 2:
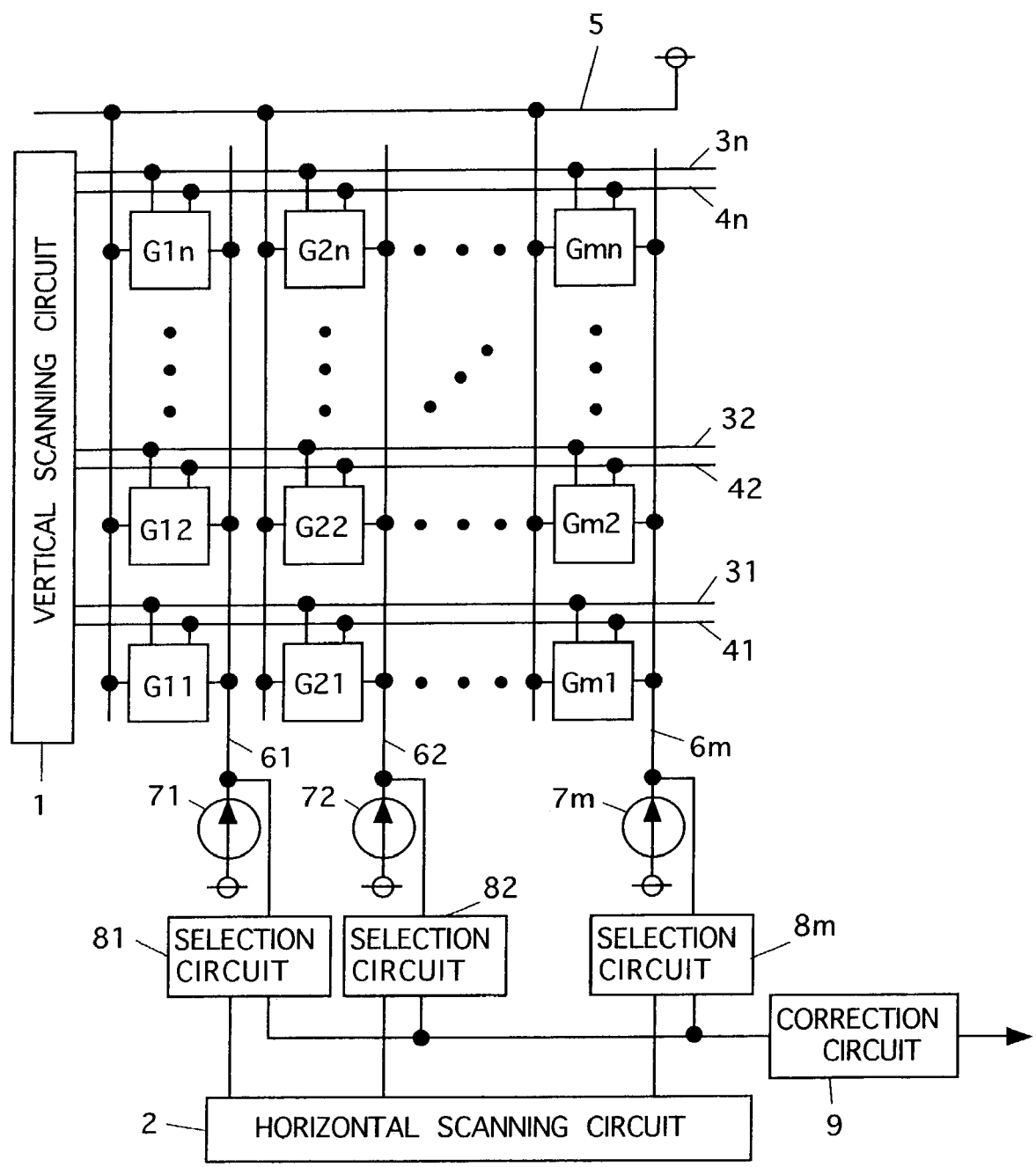
FIG. 2 is a block diagram showing a configuration of a portion having pixels arranged therein.
Figure 3:
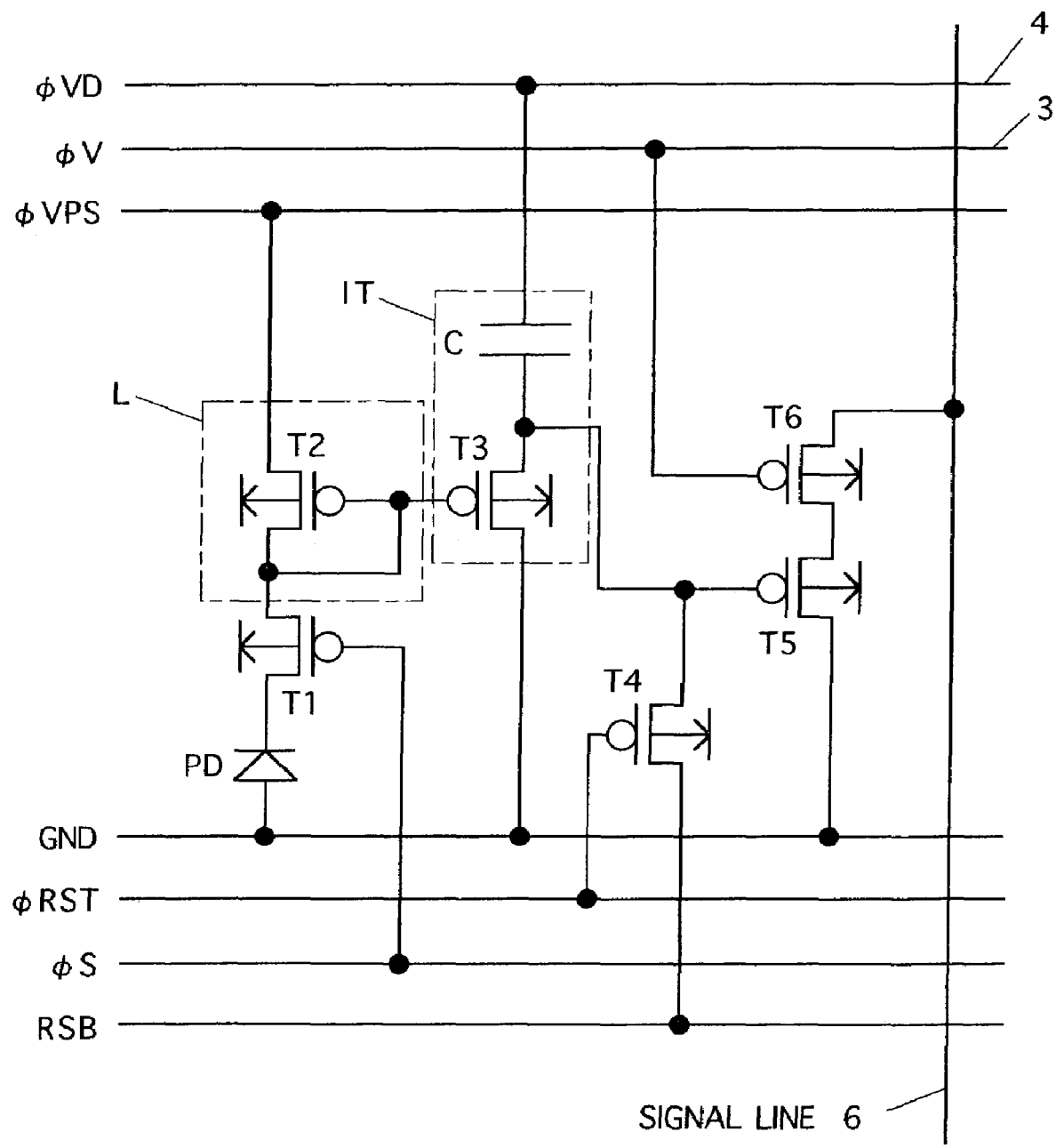
FIG. 3 is a diagram showing a configuration of a single pixel.
Figure 4:
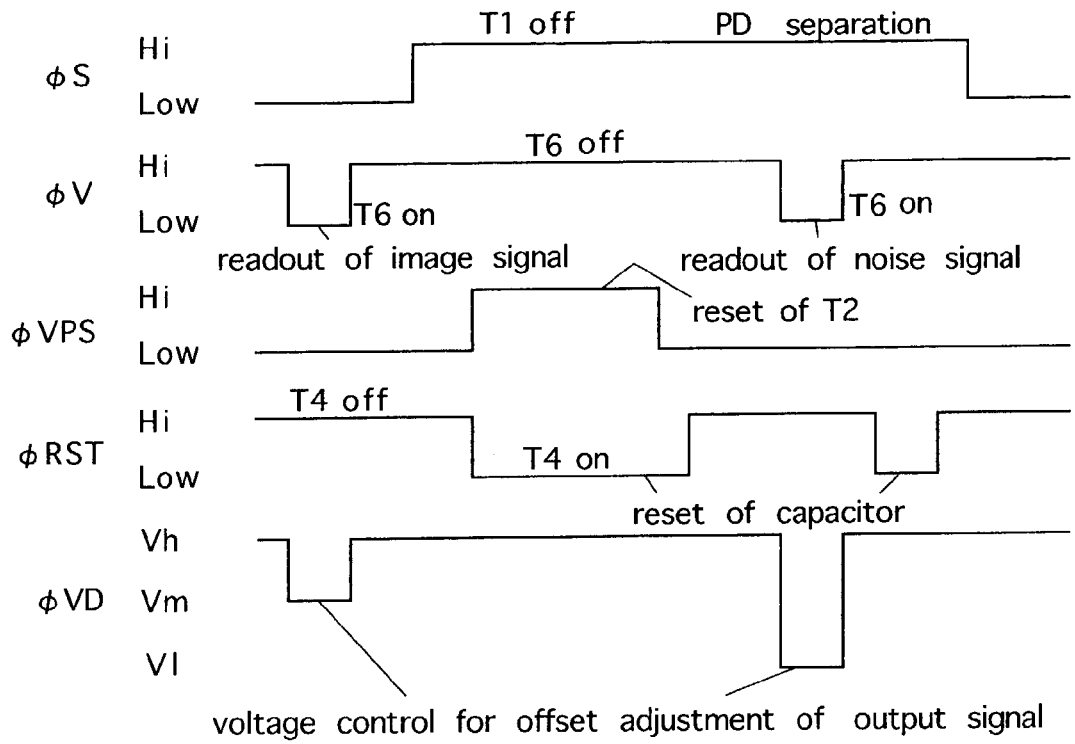
FIG. 4 is a timing chart showing how a normal image pickup state is realized.
Figure 5:
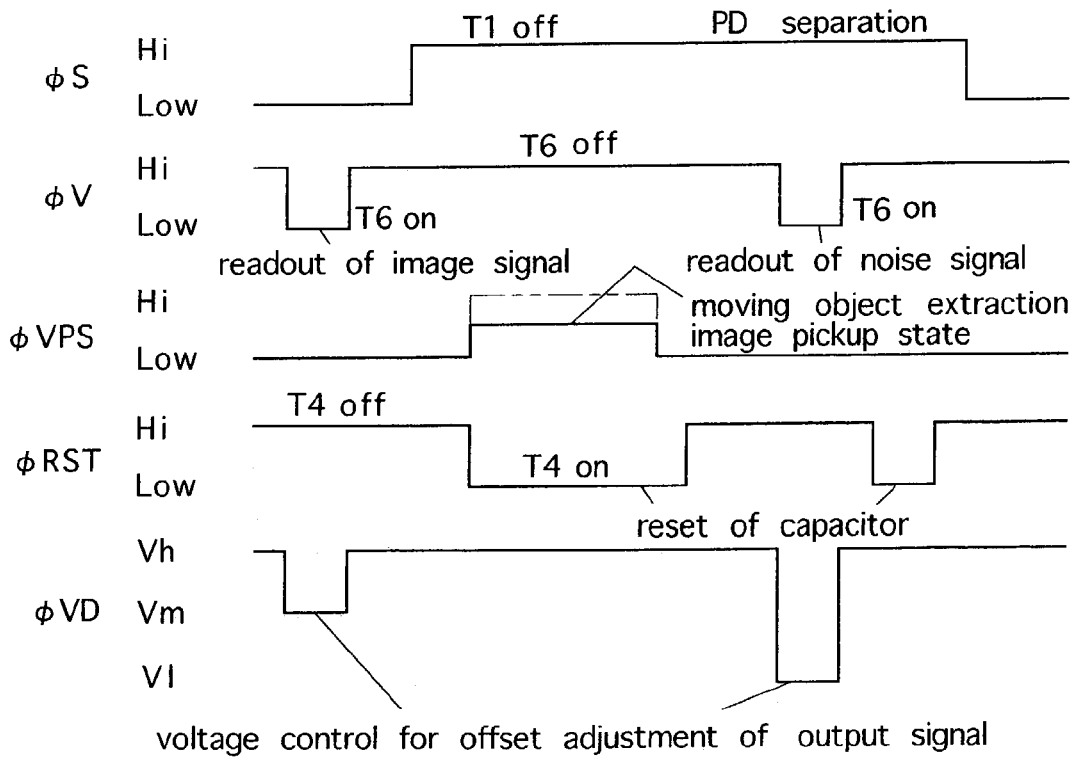
FIG. 5 is a timing chart showing how a moving object extraction image pickup state is realized.

An example of the solid-state image pickup apparatus will be described with reference to FIGS. 1 to 5. FIG. 1 is a block diagram showing an overall configuration of an example of the solid-state image pickup apparatus. FIG. 2 is a block diagram showing a configuration of a portion having pixels arranged therein. FIG. 3 is a diagram showing a configuration of a single pixel. FIG. 4 is a timing chart showing how a normal image pickup state is realized. FIG. 5 is a timing chart showing how a moving object extraction image pickup state is realized.

The above-mentioned image pickup apparatus has a pixel member G, a vertical scanning circuit 1 connected thereto and an output circuit 8 as shown in FIG. 1. Connected to the output circuit 8 are a horizontal scanning circuit 2 and an output amplifier Am. The pixel member G and others constitute an image pickup sensor capable of switching the state of the image pickup sensor between a normal image pickup state and a moving object extraction image pickup state by changing driving conditions of the image pickup sensor.

The image pickup apparatus includes a voltage controller 10 for supplying specified voltage signals to the pixel member G via a voltage regulator Rg, and is provided with a timing generator TG for operating the parts or members of the apparatus with a specified timing. The voltage controller 10 has a manually operable switch SW for giving instructions to effect change-over between the normal image pickup state and the moving object extraction image pickup state. The change-over between the normal image pickup state and the moving object extraction image pickup state can be executed by instructing a switching circuit internally fitted in the voltage controller 10 to execute change-over between the normal image pickup state and the moving object extraction image pickup state by manual operation of the switch SW.

The pixel member G has image pickup pixels G11 to Gmn arranged in row and column lines (arranged in a matrix form) as shown in FIG. 2. The vertical scanning circuit 1 is capable of successively scanning row lines 31, 32, . . . 3n for feeding a scanning signal øV to each pixel while feeding a voltage øVD via lines 41, 42, . . . 4n to the undermentioned capacitor C of each pixel.

The horizontal scanning circuit 2 is so configured that photoelectric conversion signals led from the pixels to output signal lines 61, 62, . . . 6m are read out in a horizontal direction (row direction), sequentially pixel by pixel. Indicated at 5 in FIG. 2 is a power source line.

In FIG. 3 to be described later, a row line is designated 3, a øVD feed line is designated 4 and an output signal line is designated 6.

Connected to the pixels are other lines (e.g., clock lines, bias supply lines, etc.) as well as the foregoing lines 31, 32, . . . 3n, 41, 42, . . . 4n, output signal lines 61, 62, . . . 6n and power source line 5. However, these other lines are not shown in FIG. 2.

The output circuit 8 shown in FIG. 1 includes constant current power sources 71, 72, . . . 7m, selection circuits 81, 82, . . . 8m and a correction circuit 9 which are shown in FIG. 2.

The constant current power sources 71, 72, . . . 7m are connected to the output signal lines 61, 62, . . . 6m, respectively. The selection circuits 81, 82, . . . 8m are capable of sampling and holding image signals and noise signals fed from the pixels G11 to Gmn via the signal lines 61, 62, . . . 6m. The correction circuit 9 is adapted to carry out a correction processing when receiving the image signals and the noise signals continuously fed from the selection circuits 81, 82, . . . 8m. Namely a difference between the image signal and the noise signal is deducted from the image signal so that the image signal with the noise signal removed is outputted to outside to achieve image display. A direct current voltage VPS is applied to each terminal end of the constant current power sources 71 to 7m.

In such solid-state image pickup apparatus, each of the image signal and the noise signal outputted from the pixel Gab (a: natural number of $1 \leq a \leq m$, b: natural number of $1 \leq b \leq n$) is outputted via the output signal line 6a (a: natural number of $1 \leq a \leq m$) and is amplified by the constant current power source 7a (a: natural number of $1 \leq a \leq m$) connected to the output signal line 6a. The image signal and the noise signal outputted from the pixel Gab are successively fed to the selection circuit 8a (a: natural number of $1 \leq a \leq m$). In the selection circuit 8a, the image signal and the noise signal are sampled and held. Then, the image signal sampled and held by the selection circuit 8a is fed to the correction circuit 9. Thereafter the noise signal sampled and held is fed to the correction circuit 9. In the correction circuit 9, the image signal fed from the selection circuit 8a is processed for correction based on the noise signal sent from the selection circuit 8a, and the noise-removed image signal is amplified via the output amplifier Am and is outputted toward outside. Examples of configurations of the selection circuits 81 to 8m and the correction circuit 9 include those proposed in U.S. patent application Publication Ser. No. 2001/0013571A1. The selection circuits 81, 82, . . . 8m may include a correction circuit.

An example of each of the pixels G11 to Gmn is described below with reference to FIG. 3.

The pixel shown in FIG. 3 comprises a photodiode PD as an example of the photoelectric conversion element, a logarithmic converter L including a logarithmic-converting MOS transistor T2 for converting an output of the photodiode PD into an electric signal proportional to a logarithmic value of an amount of light incident on the photodiode PD, and an integration circuit IT having a capacitor C for accumulating an output of the logarithmic converter L. Each pixel also includes MOS transistors T1 and T3 to T6.

Stated more specifically, in each pixel, the drain of the MOS transistor T1 for use in switching is connected to the cathode of the photodiode PD with the anode grounded. The gate and drain of the MOS transistor T2 for logarithmic conversion and the gate of the MOS transistor T3 are connected to the source of the transistor T1. The transistor T3 is provided to flow a current corresponding to a signal logarithmically converted.

Connected to the source of the MOS transistor T3 are the gate of the MOS transistor T5 serving as a source follower and the drain of the MOS transistor T4 for resetting the capacitor. The drain of the MOS transistor T6 for use in switching (for reading out a signal) is connected to the source of the MOS transistor T5. The source of the MOS transistor T6 is connected to the output signal line 6 (corresponding to the output signal lines 61 to 6m in FIG. 2). All of the MOS transistors T1 to T6 are transistors of P-channel type.

A signal øVPS is inputted to the source of the MOS transistor T2 for logarithmic conversion. The drains of the MOS transistors T3, T5 are grounded. The capacitor C is connected to the source of the MOS transistor T3. The reference voltage (the signal øVD) is inputted to the capacitor C to integrate an electric signal from the photodiode PD in the capacitor C.

A direct current voltage RSB is inputted to the source of the MOS transistor T4, and a signal øRST is inputted to the gate of the MOS transistor T4. A signal øS for on- or off-operation of the transistor T1 is inputted to the gate of the MOS transistor T1, and a signal øV for on- or off-operation of the transistor T6 is inputted to the gate of the MOS transistor T6.

In the pixels configured as described above, the constant current power source 7a (corresponding to the constant current power sources 71 to 7m in FIG. 2) having the end to which the direct current voltage VPS is applied is connected to the source of the MOS transistor T5 via the MOS transistor 6 and the output signal line 6.

Consequently, when the MOS transistor T6 is in on-state, the MOS transistor T5 is operated as a MOS transistor of source follower type and a voltage signal amplified by the constant current power source 7a is outputted to the output signal line 6.

An amplifier circuit capable of outputting a signal at a high level is configured by such source follower circuit. Accordingly the signal sufficiently amplified to a high level by the amplifier circuit is obtained, thereby facilitating an signal processing at an ensuing signal processing circuit (not shown)

The constant current power sources 71 to 7m constituting a load resistance portion of the amplifier circuit are disposed not in the pixels but at each of the output signal lines 61 to 6m to which the pixels arranged in the direction of column are connected, whereby the number of load resistance or constant current power source can be reduced and an area occupied by amplifier circuits on a semiconductor chip can be decreased.

The following description is given, first, on an normal image pickup operation and an operation for detection of sensitivity irregularities among the pixels in the above-described image pickup apparatus, followed by an operation for detection of the existence of a moving object.

The signal øVPS to be applied to the source of the logarithmic-converting MOS transistor T2 is a binary voltage signal when achieving the normal image pickup state. That is, a low voltage is applied for operation of the transistor T2 in a subthreshold region when reading but the image signals and the noise signals due to sensitivity irregularities. When the transistor T2 is reset, a voltage higher than the low voltage is applied to allow flow of larger current than when supplying the low signal øVPS to the transistor.

To bring about the moving object extraction image pickup state for detecting the existence of a moving object, a voltage at an intermediate level between the low voltage and the high voltage is applied instead of the high voltage when resetting the transistor T2.

As to the reference voltage øVD to be applied to the capacitor C, a ternary voltage signal is used in any of the normal image pickup state and the moving object extraction image pickup state. In other words, the highest voltage value Vh is applied in the integration operation of capacitor C; a lower voltage Vm lower than Vh is applied in reading out the image signal; and a voltage Vl further lower than Vm is applied in reading out the noise signal.

In the following description, voltage signals are fed to the pixels and others by the voltage controller 10 via the voltage regulator Rg.

(1-1) Image Pickup Operation in Normal Image Pickup State

The switch SW fitted in the voltage controller 10 is set on the side of normal image pickup state.

(1-1-1) Image Signal Output

In the following description, the signal øS for turning on or off the MOS transistor T1 is low all the time during the image pickup operation and the transistor T1 is turned on. The signal øRST to be fed to the transistor T4 for resetting the capacitor is set high (Hi) and the transistor T4 is turned off. The signal øVPS to be fed to the source of the transistor T2 is set low to allow the MOS transistor T2 to operate in the subthreshold region while the voltage value of the signal øVD to be fed to the capacitor C is set at Vh, thereby allowing the capacitor C to execute the integration operation.

A photo current is generated when image light comes from an image picked-up region onto the photodiode PD in such state. Then a voltage is generated at the gates of the transistors T2, T3 due to the subthreshold operation of the transistor T2. The foregoing voltage corresponds to a value obtained by converting the photo current so that it is natural-logarithmically varied with respect to an amount of the incident light.

Based on the voltage natural-logarithmically variable with respect to the amount of the incident light, the drain current amplified at the transistor T3 flows from the capacitor C and the capacitor C discharges electricity. Thereby a gate voltage of the MOS transistor T5 becomes proportional to a natural-logarithmic value of an integrated amount of the incident light.

In order to read out the image signal obtainable by the integration operation of the capacitor C, the voltage value of the signal øVD is set at Vm and a low pulse signal øV is fed to the MOS transistor T6. Thereby a source current according to the gate voltage of the MOS transistor T5 is allowed to flow toward the output signal line 6 via the MOS transistor T6.

At that time, since the transistor T5 is allowed to operate as a source follower type MOS transistor, an image signal appears as an voltage signal at the output signal line 6. Thereafter the signal øV is set high, and the transistor T6 is turned off while the voltage value of the signal øVD is set at Vh. The image signal outputted via the transistors T5, T6 becomes proportional to the gate voltage of the transistor T5, and therefore, becomes proportional to the natural-logarithmic value of the integrated amount of the light incident on the photodiode PD.

(1-1-2) Detection of Sensitivity Irregularity (Noise Signal Output)

As shown in FIG. 4, the pulse signal øVD of voltage value Vm and the low pulse signal øV are applied and the image signal is outputted. Then the signal øVD is set at Vh, and thereafter the signal øS is set high to turn off the transistor T1, and a reset operation is started. At that time, positive charge flows in from the source side of the transistor T2, and negative charges accumulated at the gate and drain of the transistor T2 and at the gate of the transistor 3 are recoupled so that the potential of the gate and drain of the transistor T2 is elevated to a certain extent.

However, when the potential of the gate and drain of the transistor T2 is elevated to a certain value, the reset speed is lowered. This tendency becomes significant when a bright image picked-up region abruptly becomes dark. Therefore, the signal øVPS to be fed to the source of the transistor T2 is set high.

When the source voltage of the transistor T2 is increased as described above, the amount of positive charge flowing from the source side of the transistor T2 is increased, and negative charges accumulated at the gate and drain of the transistor T2 and at the gate of the transistor 3 are quickly recoupled. At that time, the signal øRST is set low, the transistor T4 is turned on, and the voltage at a node connecting the capacitor C and the gate of the transistor T5 is initialized.

When the signal øVPS is set high, the potential of the gate and drain of the transistor T2 becomes further higher. Then, the signal øVPS to be fed to the source of the transistor T2 is set low and the potential state of the transistor T2 is returned to the original state. In this way, the potential state of the transistor T2 is reset to the original state, then the signal øRST is set high and the transistor T4 is turned off.

Then, the capacitor C is allowed to execute the integration operation. Thus the voltage at the node connecting the capacitor C and the gate of the transistor T5 corresponds to the gate voltage of the reset transistor T2. Then the pulse signal øV is fed to the gate of the transistor T6, the transistor T6 is turned on and the voltage value of signal øVD is set at V1.

Thereby an output current showing the irregularity of sensitivity of each pixel which is caused due to the irregularities of characteristics of the transistors T2, T3 is allowed to flow in the output signal line 6.

At that time, the transistor T5 is operated as a source follower type MOS transistor so that a noise signal appears as a voltage signal in the output signal line 6. Thereafter the pulse signal øRST is fed again to the transistor T4, and the voltage at the node connecting the capacitor C and the gate of the transistor T5 is reset. Then, the signal øS is set low and the transistor T1 is set to a conducting state to achieve a state wherein the image pickup operation can be performed.

In the foregoing description, although the three voltages, i.e. Vh, Vm, Vl are employed as to the voltage øVD to be applied to the capacitor C for integrating the electric signal obtained by photoelectric conversion, the voltage øVD to be fed to the capacitor C for integrating the electric signal may be constant. However, the offset in the noise-removed image signal can be lowered by use of the three voltage values as described above, whereby the operating range of an output buffer, an AD converter or the like (not shown) connected to the image pickup apparatus can be effectively used. The voltage value of the signal øVD to be fed to the capacitor C in reading out an image signal may be set higher than the voltage value to be fed at the time of the integration.

While the image pickup apparatus described above has the pixels so configured as to include P-channel type MOS transistors, the pixels may have a configuration incorporating N-channel type MOS transistors.

In these configurations, the polarity of each element is reversed. The polarity is reverse to that in FIG. 2 as to the constant current power sources 71 to 7m provided in the solid-state image pickup apparatus. Except this feature, these embodiments may have substantially the same configuration as the image pickup apparatus explained hereinbefore.

(1-2) Image Pickup Operation in the Moving Object Extraction Image Pickup State

The switch SW fitted in the voltage controller 10 is disposed on the side of the moving object extraction image pickup state.

The operation for image signal output is the same as in the case of the normal image pickup state. A voltage signal, however, which is at an intermediate level between the high level and the low level as shown in FIG. 5, i.e., at ½ the absolute value of difference between the low signal and the high signal is used as the signal øVPS to be used in the resetting processing of the MOS transistor T2 in the noise signal output operation instead of the high signal øVPS in the case of noise signal output in the normal image pickup state.

Thereby the moving object extraction can be performed. Other operations can be executed in the same manner as the noise output processing in the normal image pickup state. A voltage signal may be used which is at an intermediate level between the high level and the low level instead of the low signal øVPS in the case of noise signal output in the normal image pickup state.

In the moving object extraction image pickup state, as done in the normal image pickup state, the difference between the image signal outputted from the pixel in image pickup operation using øVPS set low in the moving object extraction image pickup state and the noise signal outputted from the pixel in resetting the MOS transistor T2 using øVPS set at ½ the high level is subtracted from the image signal by finite difference processing with the correction circuit 9 and the noise-removed image signal is outputted.

However, a reset residue occurs in the MOS transistor T2 since the voltage signal is applied at the intermediate level between the high level and the low level as the signal øVPS to be used in reset processing of the MOS transistor T2 instead of the high signal øVPS used in outputting the noise signal in the case of normal image pickup state. Further, the reset residue is increased in the pixel exposed by an increased amount of incident light, whereas the reset residue is decreased in the pixel exposed by a decreased amount of incident light because of the characteristic of MOS transistor T2.

Therefore, the image signals after performing the foregoing finite difference processing are outputted at the same value as to the pixels which execute image pickup operation for a portion of the image picked-up region invariable in luminance. Thus, the signals are outputted for showing a static background part in the image picked-up region substantially uniformly in a gray color. Consequently the static background part can be displayed substantially uniformly in a gray color by an image display device (not shown in figures).

On the other hand, a moving object varies the luminance in the image picked-up region; from "dark" degree to "bright" degree; from "dark" degree to "bright" degree and therefrom to "dark" degree; from "bright" degree to "dark" degree; from "bright" degree to "dark" degree and therefrom to "bright" degree, etc. during the integration of the image signal.

When the luminance is varied from "dark" degree to "bright" degree and remains in a state of "bright" degree until start of the reset period, the image signal becomes higher than when the luminance is in a state of "bright" degree during the integration period.

Since a noise signal is outputted at a value depending only on the voltage at an input portion of the integration circuit at the time of reset start and the luminance is in the state of "bright" degree at the time of reset start, the noise signal is the same as in a state of "bright" degree all the time. Then an image signal output is reduced after the finite difference processing, and the resulting image becomes dark as to a part in the image picked-up region, incident light from which has changed from "dark" degree to "bright" degree. Although the image signal is lower and the noise signal is lower than when it has remained at a state of "dark" degree all the time, the lowered degree of the image signal level is smaller than the lowered degree of the noise signal level. Accordingly, after the finite difference processing, the image signal output is reduced.

When the luminance changes from "dark" degree to "bright" degree and therefrom to "dark" degree and remains in a state of "dark" degree until start of the reset period, the image signal becomes lower than when the luminance is in a state of "dark" degree all the time during the integration period.

The noise signal is outputted at a value depending only on the voltage at the input potion of the integration circuit at the time of reset start. Since the luminance is in the state of "dark" degree at the time of reset start, the noise signal remains the same as in a state of "dark" degree all the time. Thus the image signal output is increased after the finite difference processing, and the resulting image becomes bright as to a part in the image picked-up region, the incident light from which changes from "dark" degree to "bright" degree and therefrom to "dark" degree.

When the luminance is varied from "bright" degree to "dark" degree, an image signal output increases after the finite difference processing for the same reason, and an obtained image of a part varied in luminance becomes bright.

When the luminance is varied from "bright" degree to "dark" degree and therefrom to "bright" degree, an image signal output decreases after the finite difference processing, and an obtained image of a part varied in luminance becomes dark.

The part of the subject varied in the incident light therefrom can be extracted due to such phenomenon, whereby the existence of a moving object can be detected.

One-frame image pickup data outputted from the image pickup apparatus include data indicating the existence of a moving object if it is present in the image picked-up region. The data showing the existence of a moving object include data indicative of the travelling locus of the moving object. The travelling locus can be indicated by the extent of width of a part which is darkly or brightly displayed (in other words, travelling speed of the moving object) and the direction of the width (i.e., travelling direction of the moving object).

Therefore, it is possible to find the travelling speed and/or the direction of the moving object from the data indicative of the travelling locus of the moving object. Moreover, the travelling speed and/or the direction of the moving object can be automatically determined with ease based on the data indicative of the travelling locus of the moving object using a calculator (not shown). The travelling speed and/or the direction of the moving object can be also easily determined with human eyes using, e.g., a table showing a relation between the width and the speed and the like.

Figure 6A:
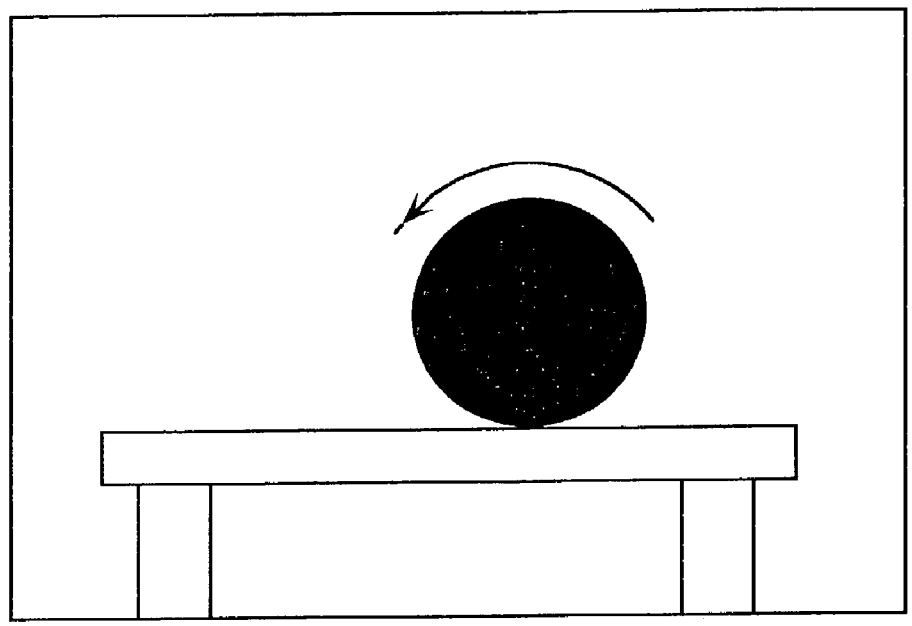
FIG. 6(A) shows an image pickup operation effected to sense a image picked-up region including a moving object (ball) in the normal image pickup state.
Figure 6B:
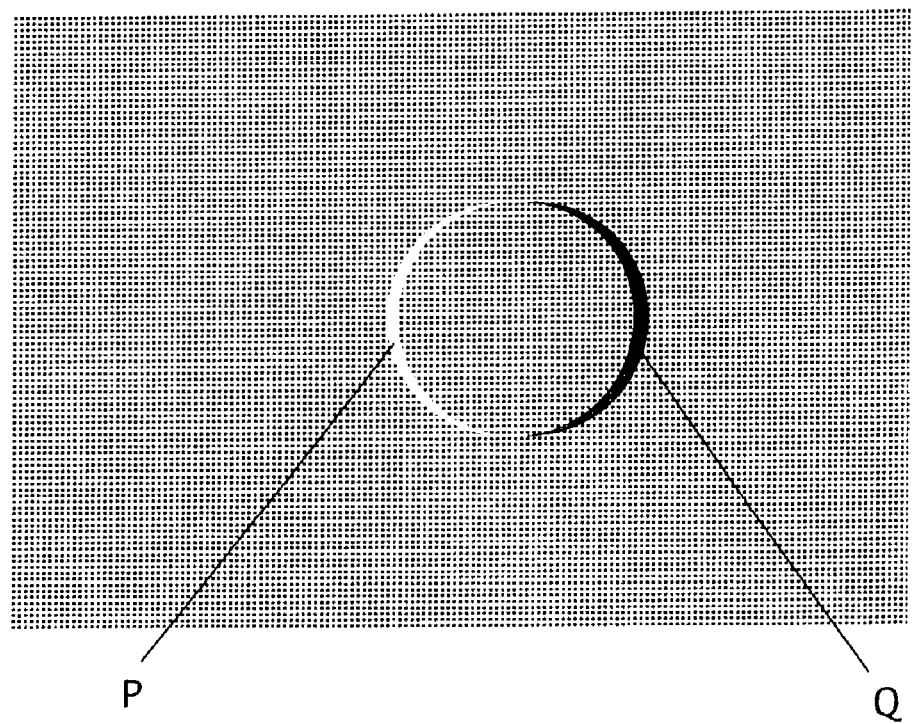
FIG. 6(B) shows an image pickup operation effected to sense the image picked-up region including the moving object in the moving object extraction image pickup state.

FIG. 6(A) shows an image pickup example in which using the image pickup apparatus of the type described above, an image pickup operation is executed to sense an image picked-up region including a moving object in the normal image pickup state, and FIG. 6(B) shows an image pickup example in which using the image pickup apparatus of the type described above, an image pickup operation is executed to sense the image picked-up region including the moving object in the moving object extraction image pickup state. The illustrated moving object is a black ball which is rolling from right to left in the drawing on a table placed in front of a white wall.

For example, if attention is focused on right and left edges of the ball, a part of the image picked-up region with luminance being varied from "bright" degree to "dark" degree by leftward travel of the left edge of the ball when viewed from the image pickup apparatus is displayed as a bright part P having a width and a direction, while another part of the image picked-up region with luminance being varied from "dark" degree to "bright" degree by leftward travel of the right edge of the ball when viewed from the image pickup apparatus is displayed as a dark part Q having a width and a direction.

Described above is the image pickup apparatus capable of performing both the normal image pickup operation and the moving object extraction image pickup operation. However, if the voltage controller 10 is provided exclusively for the moving object extraction image pickup, the image pickup apparatus is useful solely for detecting the existence of a moving object. In this case, the switch SW is not needed.

Figure 7:
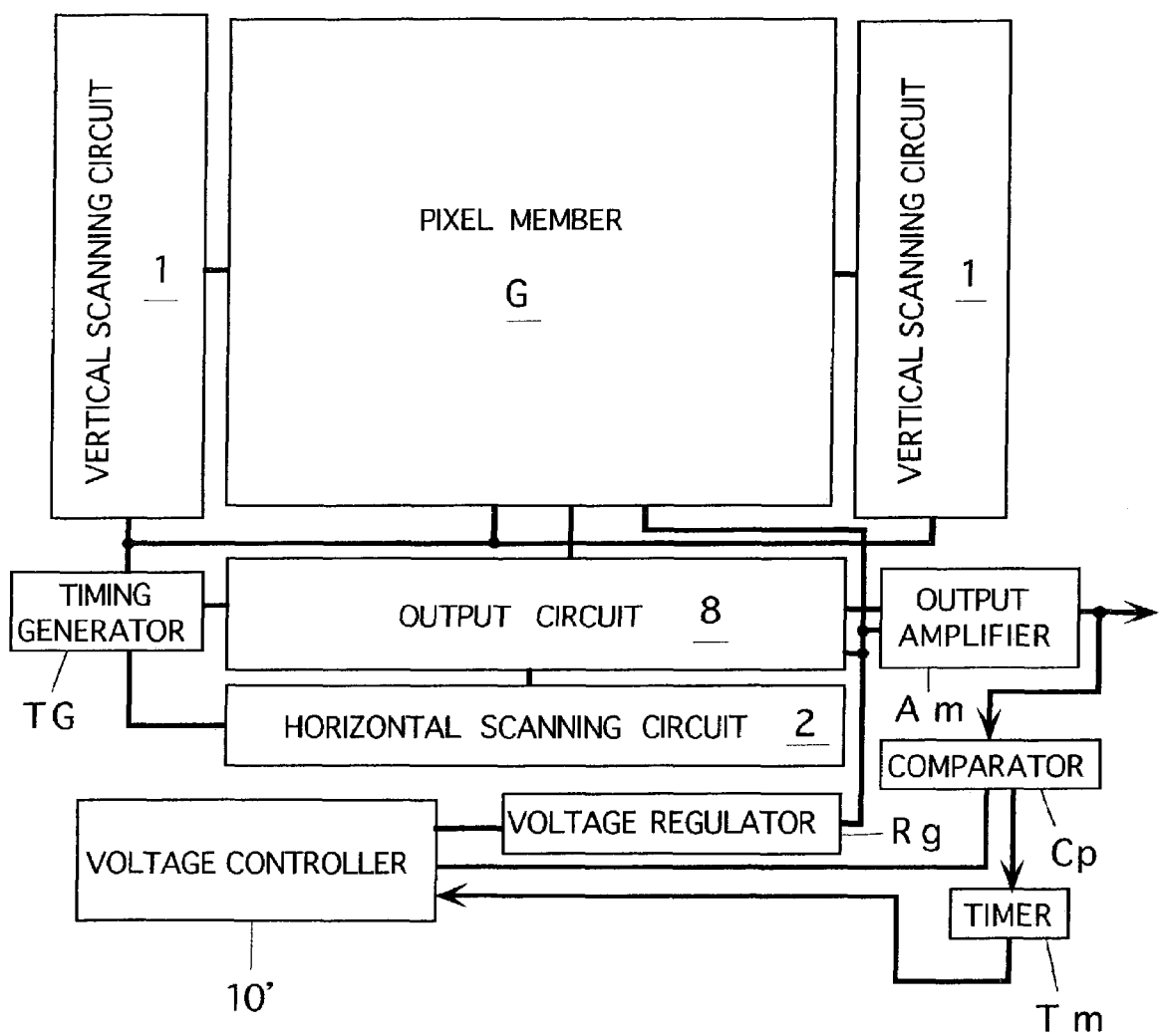
FIG. 7 is a block diagram showing another example of the solid-state image pickup apparatus.
Figure 8:
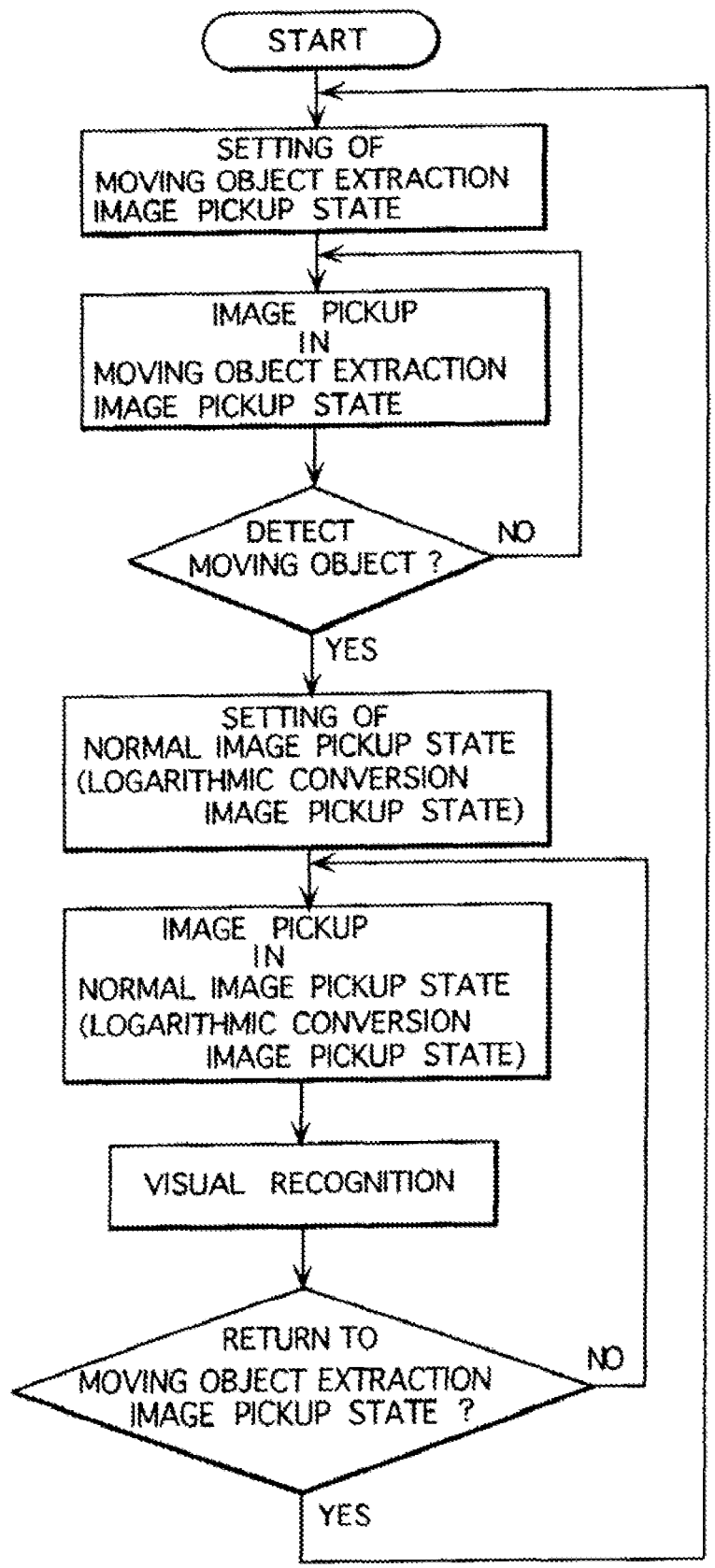
FIG. 8 is a flow chart showing an operation of the apparatus shown in FIG. 7.

Another example of the solid-state image pickup apparatus will be described with reference to FIG. 7 and FIG. 8. FIG. 7 is a block diagram showing a overall configuration of another example of the solid-state image pickup apparatus. FIG. 8 is a flow chart showing the operation of the apparatus shown in FIG. 7.

The solid-state image pickup apparatus shown in FIG. 7 has substantially the same configuration as the apparatus shown in FIG. 1 except that the voltage controller 10 is replaced by a voltage controller 10'; the output from the output amplifier Am is led to a comparator Cp; and the comparator Cp is connected to the voltage controller 10' on one hand, and is connected to the voltage controller 10' via a timer Tm on the other hand. Substantially the same parts as in the apparatus of FIG. 1 are indicated by the same reference symbols.

The illustrated image pickup apparatus is capable of determining the presence or absence of a moving object and capable of allowing an operator to more accurately visually recognize what the moving object is, if any.

The voltage controller 10' is operated as follows: the image pickup apparatus is initially set to a moving object extraction image pickup state as shown in FIG. 8; the apparatus is allowed to effect image pickup operation in this state, and the apparatus is switched to a normal image pickup state by an internal switch circuit on detecting the existence of a moving object to perform the normal image pickup operation, thereby making it possible to allow the operator to visually identify with higher reliability the moving object, whereupon the apparatus is returned to the moving object extraction image pickup state after a specified lapse of time.

More specifically, the comparator Cp is an example of a moving object detector for determining whether a moving object is included in the image pickup data in the moving object extraction image pickup state. The comparator Cp is able to compare the image pickup data outputted from the output amplifier Am with preparatory reference data for finding whether a moving object exists, and is able to input the comparison result into the voltage controller 10' while starting the timer Tm.

The timer Tm is an example of a signal generator for feeding a switch signal for changing the image pickup state from the normal image pickup state to the moving object extraction image pickup state to the switch circuit internally fitted in the voltage controller 10'. The switch signal is fed on count of a second(s) for a specified time from the start of the timer. Thereafter the timer is returned to the initial state.

When the comparison result from the comparator Cp shows the existence of a moving object, the voltage controller 10' is operated such that the moving object extraction image pickup state is switched to the normal image pickup state by the internal switch circuit. The switching is not executed when the comparison result from the comparator Cp shows no presence of a moving object.

When the moving object extraction image pickup state is switched by the voltage controller 10' to the normal image pickup state, the normal image pickup state is returned to the moving object extraction state based on the switch signal inputted from the timer Tm on count of a second(s) for a specified time after the switching.

The reference data for use in the comparator will be described below. The output signal from the output amplifier Am in the moving object extraction image pickup state is fed at a constant value for performing constant intermediate tone display (gray herein) in the absence of a moving object, or is fed as an output signal which is high or low as to an edge part of a moving object in the presence of the moving object. Consequently for example, when an output value of each image included in the image pickup data in the moving object extraction image pickup state exceeds a high or low pre-set threshold value, the moving object can be recognized as detected. The signals outputted from the output amplifier Am are inputted in the comparator and are successively compared with the threshold values set at a high level and a low level, whereby the absence or presence of a moving object can be determined.

In return from the normal image pickup state to the moving object extraction image pickup state, a switch device capable of manually switching the image pickup state after visually inspecting or confirming the moving object may be provided without use of the timer or the like.

In the above described embodiments, while two different voltage levels are designed to the signal øVPS for resetting the transistor T2 to carry out two different states, i.e., the normal image pickup state and the moving object extraction image pickup state, the present invention is not limited to to this concrete example. For instance, for the two different states, waveforms having same voltage level and different pulse width may be set to øVPS for the resetting purpose. Specifically, for the resetting purpose in the moving object extraction image pickup state, the signal øVPS may have a waveform of the high voltage and short pulse width to achieve incomplete resetting of the transitor T2.

Although the present invention has been described and illustrated in detail, it is clearly understood that the same is by way of illustration and example only and is not to be taken by way of limitation, the spirit and the scope of the present invention being limited only by the terms of the appended claims.

What is claimed is:

1. A solid-state image pickup apparatus comprising:
   a plurality of pixels each with a photoelectric conversion element, a logarithmic converter including a logarithmic-converting transistor for converting an output of the photoelectric conversion element into an electric signal proportional to a logarithmic value of an amount of light incident on the photoelectric conversion element, and an integration circuit for accumulating an output from the logarithmic converter;
   a voltage controller for controlling a voltage to be applied to the logarithmic-converting transistor; and
   an output circuit for receiving signals from the pixels and outputting signals;
   wherein the voltage controller is configured such that a first voltage for image pickup is applied to the logarithmic-converting transistor while a first signal outputted through the logarithmic converter from the photoelectric conversion element is accumulated at the integration circuit, a second voltage for resetting the logarithmic-converting transistor is applied to the logarithmic-converting transistor while a second signal outputted through the logarithmic converter from the photoelectric conversion element is accumulated at the integration circuit, and the second voltage is set at a value at which an absolute value of difference between the first voltage and the second voltage is lower than a value at which a normal image pickup state is achievable, thereby realizing a moving object extraction image pickup state in which an image pickup signal is generated for displaying at least a part of a moving object existing in an image picked-up region at a density different from that of a static background part existing in the image picked-up region; and
   wherein the output circuit outputs the signals each corresponding to difference between the first signal and the second signal.

2. A solid-state image pickup apparatus according to claim 1, wherein the voltage controller is configured such that the first voltage and the second voltage are set so as to generate the image pickup signal for displaying entire area of the static background part at a uniform intermediate density in the moving object extraction image pickup state.

3. A solid-state image pickup apparatus according to claim 1, wherein one-frame image pickup data obtained in the moving object extraction image pickup state include data indicative of a travelling locus of the moving object when the moving object exists in the image picked-up region.

4. A solid-state image pickup apparatus according to claim 1, wherein the voltage controller is configured such that the moving object extraction image pickup state is realized by the second voltage different from that at which the normal image pickup state is obtained.

5. A solid-state image pickup apparatus according to claim 1, wherein a switch is further provided for electrically detachably contacting the photoelectric conversion element with the logarithmic-converting transistor; and wherein the voltage controller is configured such that with the switch off, the logarithmic-converting transistor is reset by applying the second voltage to the transistor.

6. A solid-state image pickup apparatus comprising:
   a plurality of pixels each with a photoelectric conversion element, a logarithmic converter including a logarithmic-converting transistor for converting an output of the photoelectric conversion element into an electric signal proportional to a logarithmic value of an amount of light incident on the photoelectric conversion element, and an integration circuit for accumulating an output from the logarithmic converter;
   a voltage controller for controlling a voltage to be applied to the logarithmic-converting transistor; and
   an output circuit for receiving signals from the pixels and outputting signals;
   wherein the voltage controller is configured such that a first voltage for image pickup is applied to the logarithmic-converting transistor while a first signal outputted through the logarithmic converter from the photoelectric conversion element is accumulated at the integration circuit, a second voltage for resetting the logarithmic-converting transistor is applied to the logarithmic-converting transistor while a second signal outputted through the logarithmic converter from the photoelectric conversion element is accumulated at the integration circuit, and the second voltage is so controlled as to execute change-over between a normal image pickup state and a moving object extraction image pickup state in which an image pickup signal is generated for displaying at least a part of a moving object existing in an image picked-up region at a density different from that of a static background part existing in the image picked-up region; and wherein the output circuit outputs the signals each corresponding to difference between the first signal and the second signal.

7. A solid-state image pickup apparatus according to claim 6, wherein the voltage controller controls the second voltage such that an absolute value of difference between the first voltage and the second voltage is lower than a value at which the normal image pickup state is achievable, whereby change-over to the moving object extraction image pickup state is executed.

8. A solid-state image pickup apparatus according to claim 6, wherein the voltage controller controls the second voltage such that an absolute value of difference between the first voltage and the second voltage is approximately half of a value at which the normal image pickup state is achievable, whereby change-over to the moving object extraction image pickup state is executed.

9. A solid-state image pickup apparatus according to claim 6, wherein the voltage controller controls the second voltage such that an absolute value of difference between the first voltage and the second voltage is higher than a value at which the moving object extraction image pickup state is achievable, whereby change-over to the normal image pickup state is executed.

10. A solid-state image pickup apparatus according to claim 6, wherein a switch is further provided for electrically detachably contacting the photoelectric conversion element with the logarithmic-converting transistor; and wherein the voltage controller is configured such that with the switch off, the logarithmic-converting transistor is reset by applying the second voltage to the transistor.

11. A solid-state image pickup apparatus according to claim 6, wherein the logarithmic-converting transistor in the logarithmic converter is a MOS transistor; wherein the voltage controller is configured such that in a state wherein the first voltage is applied to a source electrode of the logarithmic-converting MOS transistor at the time of image pickup, a signal outputted via the logarithmic converter from the photoelectric conversion element is accumulated as the first signal at the integration circuit, and a signal obtained by applying the second voltage to the source electrode of the logarithmic-converting MOS transistor at the time of the reset to reset the transistor is accumulated as the second signal at the integration circuit.

12. An image pickup apparatus comprising:
an image pickup sensor capable of conducting a change-over, by change of driving conditions of the image pickup sensor, between a normal image pickup state and a moving object extraction image pickup state in which an image pickup signal is generated for displaying at least a part of a moving object existing in an image picked-up region at a density different from that of a static background part existing in the image picked-up region, said image pickup sensor having a plurality of pixels each with a photoelectric conversion element, and a logarithmic converter including a logarithmic-converting transistor for converting an output of the photoelectric conversion element into an electric signal proportional to a logarithmic value of an amount of light incident on the photoelectric conversion element;
a moving object detector for determining whether a moving object is included in image pickup data in the moving object extraction image pickup state; and
a switch circuit for switching the state of the image pickup sensor from the moving object extraction image pickup state to the normal image pickup state by change of the driving conditions of the image pickup sensor on detection of the moving object by the moving object detector, said switch circuit effecting change-over of the state of the image pickup sensor by controlling a voltage to be applied to the logarithmic-converting transistor.

13. An image pickup apparatus according to claim 12, wherein each pixel of the image pickup sensor is further provided with an integration circuit for accumulating an output of the logarithmic converter.

14. An image pickup apparatus according to claim 12, which is further provided with a signal generator for feeding to the switch circuit a switch signal for switching the image pickup sensor from the normal image pickup state to the moving object extraction image pickup state.

15. An image pickup apparatus according to claim 14, wherein the signal generator includes a timer and feeds the switch signal to the switch circuit on count of a second(s) for a specified time by the timer.

16. An image pickup apparatus according to claim 12, wherein the moving object detector includes a comparator for comparing a threshold value serving as a reference in determining presence or absence of the moving object with an output from the image pickup sensor.

17. A solid-state image pickup apparatus comprising:
a plurality of pixels each of which comprises a photoelectric conversion element, a logarithmic converter including a logarithmic-converting transistor for converting an image output of the photoelectric conversion element into an electric signal proportional to a logarithmic value of an amount of light incident on the photoelectric conversion element, and an integration circuit for accumulating an output from the logarithmic converter;
a voltage controller for controlling a voltage to be applied to the logarithmic-converting transistor; and
an output circuit for receiving signals from the pixels and outputting signals;
wherein the voltage controller is configured such that a first voltage for image pickup is applied to the logarithmic-converting transistor while a first signal outputted through the logarithmic converter from the photoelectric conversion element is accumulated at the integration circuit, a second voltage for incompletely resetting the logarithmic-converting transistor is applied to the logarithmic-converting transistor while a second signal outputted through the logarithmic converter from the photoelectric conversion element is accumulated at the integration circuit, and
wherein the output circuit outputs the signals each corresponding to difference between the first signal and the second signal.

18. A solid-state image pickup apparatus as claimed in claim 17, wherein the voltage controller is configured such that the first voltage and the second voltage are set so as to generate the image pickup signal for displaying entire area of the static background part at a uniform intermediate density in the moving object extraction image pickup state.

19. A solid-state image pickup apparatus as claimed in claim 17, wherein at least one of a voltage level and a pulse width of the second voltage is set to be insufficient for completely resetting the logarithmic-converting transistor.

* * * * *